(12) United States Patent
Harper et al.

(10) Patent No.: US 9,189,253 B2
(45) Date of Patent: Nov. 17, 2015

(54) REENTRANT WINDOW MANAGER (75) Inventors: John S. Harper, San Francisco, CA (US); Geoffrey Stahl, San Jose, CA (US); Assana M. Fard, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 871 days.

(21) Appl. No.: 13/366,181

(22) Filed: Feb. 3, 2012

(65) Prior Publication Data

US 2013/0201196 A1  Aug. 8, 2013

(51) Int. Cl.
*G09G 5/36* (2006.01)
*G06F 9/44* (2006.01)
*G09G 5/14* (2006.01)
*G09G 5/393* (2006.01)

(52) U.S. Cl.
CPC ............. *G06F 9/4445* (2013.01); *G09G 5/14* (2013.01); *G09G 5/393* (2013.01)

(58) Field of Classification Search
CPC ......... G06F 9/4445; G09G 5/14; G09G 5/393
See application file for complete search history.

(56) References Cited

U.S. PATENT DOCUMENTS

| 5,722,999 A | * | 3/1998 | Snell | 607/32 |
| 2008/0030504 A1 | * | 2/2008 | Brunner et al. | 345/473 |
| 2009/0240935 A1 | * | 9/2009 | Shukla | 713/100 |

OTHER PUBLICATIONS

"Core Animation Programming Guide." Apple Inc. Cupertino, CA. 2010. p. 1-89.

* cited by examiner

*Primary Examiner* — James A Thompson
*Assistant Examiner* — Tapas Mazumder
(74) *Attorney, Agent, or Firm* — Blank Rome LLP (57) ABSTRACT

Systems, methods, and computer readable media for implementing reentrant compositing window manager applications are described. In general, techniques are disclosed for using a second application to composite portions of hierarchically structured objects and the window manager to composite certain other portions of the same object. More particularly, a window manager application may be used to composite objects of a first type (e.g., application backing store bitmaps) and then call or invoke a second application to composite objects of a second type (e.g., hierarchically structured objects). The second type of object includes information (e.g., a reference) of the composite window manager's output buffer at the time the second application was invoked. This knowledge may be used by the second application to call back into the window manager in a manner that permits the generation of unique visual effects without violating modern memory management scriptures regarding the separation of application memory spaces.

17 Claims, 6 Drawing Sheets

REENTRANT WINDOW MANAGER

BACKGROUND

This disclosure relates generally to the field of computer graphics. More particularly, but not by way of limitation, this disclosure describes reentrant window server software.

A compositing window manager is software that draws a graphical user interface on a computer display—it positions windows, draws additional elements on windows (e.g., borders and title bars), and controls how windows interact with each other and with the rest of the desktop environment. In operation, a compositing window manager provides each application off-screen memory for window memory and composites these windows/buffers into designated memory (e.g., an assembly buffer), the contents of which represent the screen or desktop environment. Because compositing window mangers have access to all application window memory, they may also perform additional processing such as, applying two-dimensional (2D) and three-dimensional (3D) animated effects such as blending, fading, scaling, rotation, duplication, bending and contortion, shuffling, blurring, redirecting applications, and translating windows into one of a number of displays and virtual desktops.

Figure 1:
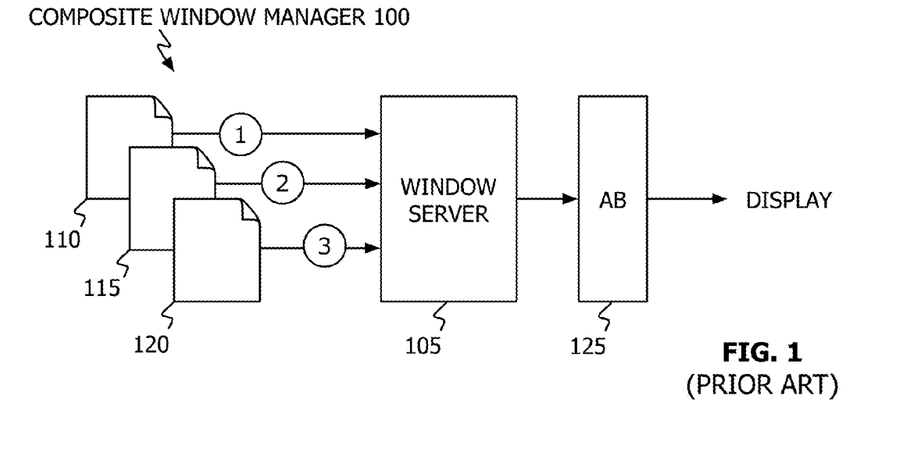
FIG. 1 shows, in block diagram form, a compositing window manager in accordance with the prior art.

Referring to FIG. 1, prior art composite window manager 100 uses window server application 105 to composite application window buffer memory 110, 115, and 120 into assembly buffer 125 in a back-to-front order (i.e., 110→115→120) such that later drawn windows (e.g., window 120) may wholly or partially occlude, such as through transparency, prior composited windows (e.g., windows 110 and 115). The centralized nature of composite window manager 100 and modern system design in which each application is allocated its own distinct and non-shared memory space, inhibits runtime applications from generating visual effects based on prior composited window memory. While window server 105 can account for prior composited content when generating a graphic effect (e.g., a blur or reflection), applications themselves cannot. Thus, it would be beneficial to provide a mechanism by which individual applications can take into account the effect of prior composited window memory without disturbing (or violating) modern memory management schemes.

SUMMARY

In one embodiment the invention provides a method to use a reentrant window manager application. The method includes a window manager application (a.k.a., a window server) compositing one or more bitmap objects (e.g., application backing stores) into an assembly buffer memory so that the assembly buffer memory has a first bitmap content. Identifying, during compositing operations, a hierarchically structured object and passing control for compositing the object to a second application (one designed to process hierarchically structured objects). Compositing the first bitmap content into a memory in response to receiving control for doing so from the second application and, thereafter, returning control to the second application. A computer executable program to implement the method may be stored in any non-transitory media that is readable and executable by a computer processor.

In another embodiment, the invention provides a method to generate graphical user interface elements. This implementation includes receiving a hierarchically structured object from a window server application, the hierarchically structured object including elements of a first type (e.g., hierarchical elements) and bitmap content (or reference to bitmap content). Once received, at least some of the first type of elements may be composited into the window server's assembly buffer memory. When the bitmap content is encountered while processing the hierarchical object, a request may be sent to the window server to composite the bitmap content into a memory. On receiving notification from the window server that the bitmap content has been composited into the memory, the remainder of the elements of the first type may be composited into the memory and, after the entire hierarchical object in processed (including causing the bitmap content to be composited into a memory by the window server), transferring control to the window server application. This embodiment too may be implemented using computer program instructions.

DETAILED DESCRIPTION

This disclosure pertains to systems, methods, and computer readable media for implementing reentrant compositing window manager applications. The described techniques permit compositing window managers to work in concert with applications designed to composite hierarchically structured objects. Illustrative hierarchically structured objects include, but are not limited to, the Mac OS X "Dock" (the icon bar at the bottom of a Mac OS X window) and the "Finder Desktop" are represented as hierarchical layer trees. In general, techniques are disclosed for using a second application to composite portions some objects and which can call back into the window manager to composite certain other portions of the same object. More particularly, a window manager application may be used to composite objects of a first type (e.g., bitmap objects such as application backing stores) and then call or invoke a second application to composite objects of a second type (e.g., hierarchically structured objects such as layer trees). The second type of object may include knowledge of the composite window manager's output buffer at the time the second application was invoked (e.g., the window manager's assembly buffer). This knowledge may be used by the second application to invoke the window manager in a manner that permits the generation of unique visual effects without violating modern memory management scriptures regarding the separation of application memory spaces.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of window management and computer graphic systems having the benefit of this disclosure.

As noted above with respect to FIG. 1, prior art window managers take as input application backing stores whose contents are bitmaps—flat data structures. In addition to compositing application bitmaps, a window manager within the Macintosh operating system, or Mac OS®, also permits applications to represent objects as layer trees—hierarchical data structures. (MAC OS is a registered trademark of Apple Inc.) When such an object is encountered during compositing operations, the window manger can send the layer tree (e.g., via a "call" operation) to a second application responsible for interpreting and compositing the layer tree's nodes into a window manager memory buffer. For information relating to layer tree objects see the "Core Application Programming Guide" (copyright 2010 by Apple Inc.), and commonly-owned patent applications 2011/0273464, entitled "Framework for Graphics Animation and Compositing Operations" (filed Jul. 19, 2011) and 2009/0225093 entitled "Buffers For Display Acceleration" (filed Mar. 3, 2009), both of which are hereby incorporated by reference in their entirety.

In accordance with this disclosure, one or more nodes within a layer tree may reference (or include) the state of a window manager's memory buffer at the time the window manager calls into the second application. As a reference to a window manager memory buffer, the layer tree node perforce corresponds to a bitmap object. As such, when the second application processes the layer or node incorporating this reference, it may call back into the window manager to composite the referenced bitmap. This call-back or reentrant behavior permits the layer tree's associated application to take into account prior composited windows (associated with other applications) to generate unique visual effects for its display window that are not possible using conventional composting window managers. (It should be noted, the layer tree's referenced bitmap represents the state of a window manager memory buffer at the time the second application was called, such state generally being different than the state of the memory buffer when the second application calls back into the memory manager.)

One illustrative "second application" in the Mac OS X environment is Core Animation. (OS X and CORE ANIMATION are registered trademarks of Apple Inc.) Another illustrative "second application" is Core Image. As currently embodied, Core Animation and Core Image are Objective-C frameworks that support the processing of layer trees as well as control over the compositing process that renders one layer on top of another. Functionally, Core Animation and Core Image sit between a programmer and the underlying graphics hardware (e.g., graphics processing units or GPUs), are threaded to take advantage of multiple central processing units (CPUs) or cores, and uses OpenGL. (OPENGL is a registered trademark of SGI International, Inc.) In various embodiments Core Animation and/or Core Image may be implemented as libraries. As commonly used, a library is a software component whose control, when executing, stays within the calling (kernel) process.

Figure 2:
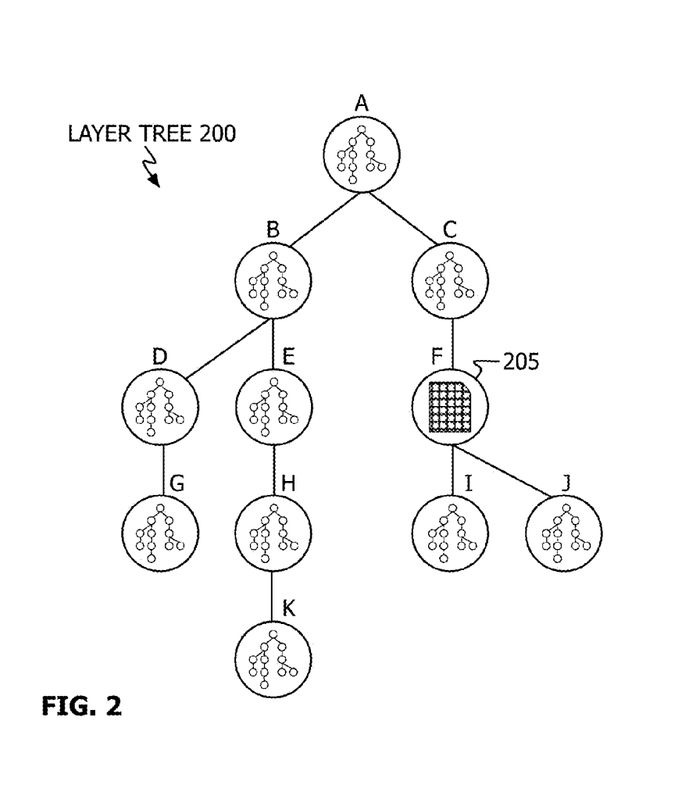
FIG. 2 shows, in schematic form, a layer tree in accordance with one embodiment.

Referring to FIG. 2, layer tree 200 in accordance with one embodiment may be represented as a hierarchically arranged collection of nodes (e.g., nodes A through K), where each layer or node represents an object having various properties and attributes, the sum of which may be used to build the associated application's graphical user interface (GUI). In general, each node in layer tree 200 may include content, windows, views, video, images, text, media, etc. In accordance with this disclosure, a layer (e.g., layer 205) may reference the state of a memory manager's memory buffer at the time the second application is called (a bitmap).

Figure 3A:
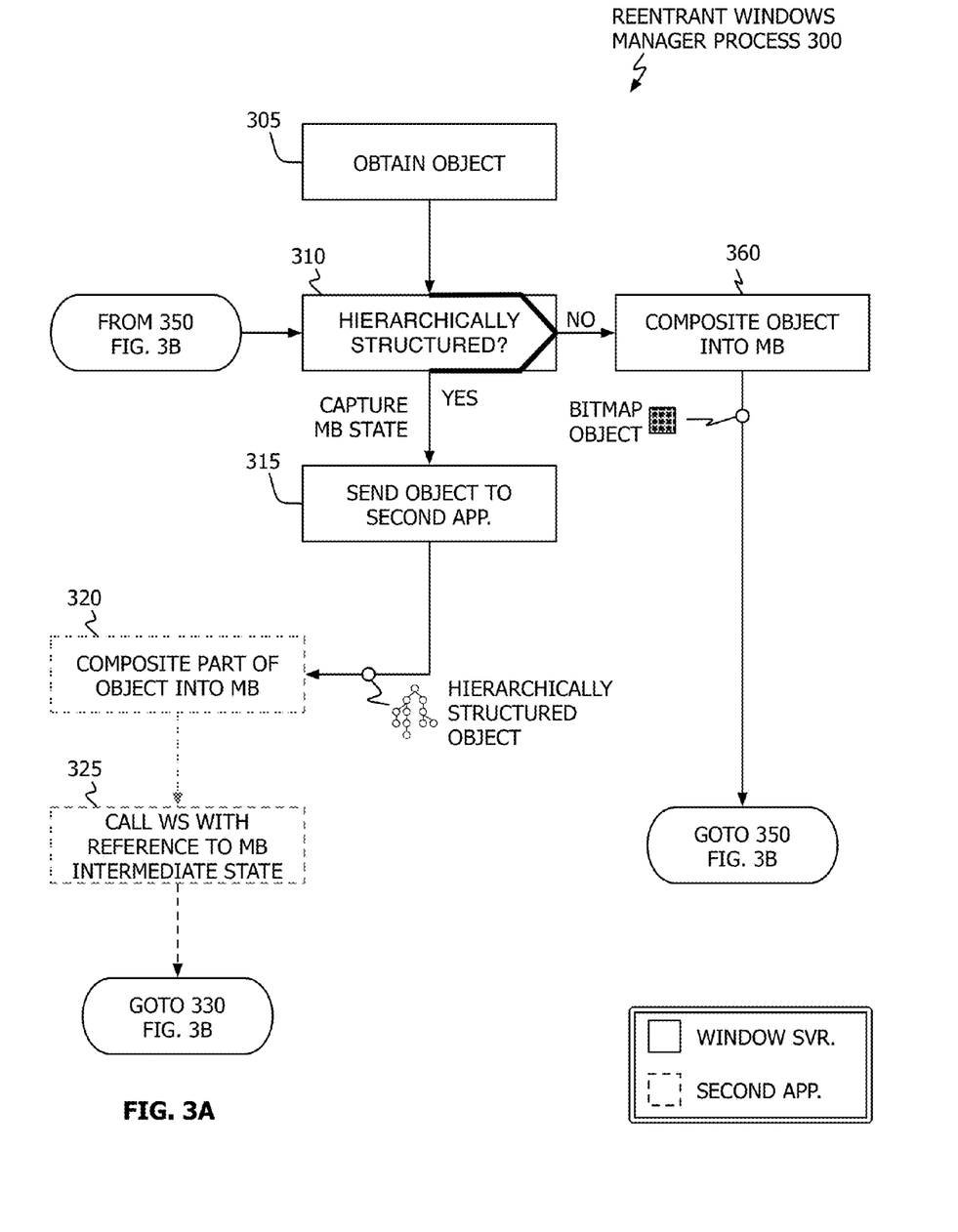
FIGS. 3A and 3B show, in flowchart form, a reentrant window manager method in accordance with one embodiment.

Referring to FIG. 3A, reentrant window manager operation 300 in accordance with one embodiment begins by obtaining a first window (block 305); recall, a window manager processes windows in a back-to-front manner. A check may then be made to determine if the obtained window contains a hierarchically structured object such as, for example, layer tree 200 (block 310). If the obtained window includes a hierarchically structured object (the "YES" prong of block 310), the object may be passed to a second application for processing (block 315). In the Mac OS, one such "second application" is Core Animation. As previously noted, a layer tree in accordance with this disclosure includes a layer that references window manager buffer memory. More specifically, such a reference is associated with the state or content of a window manger's buffer memory (i.e., a bitmap) at the time the second application is called. The second application may then process the object until it encounters the layer that references the window manger's buffer memory bitmap (block 320)—e.g., node 205 in layer tree 200. When this occurs, the second application may call the window manager back, passing it a reference to the window manager's own memory buffer (block 325). In another embodiment, the layer (e.g., layer 205) includes the aforementioned referenced bitmap. By way of example, in one Mac OS X embodiment the reference may be a character string which the window manager has previously registered with Core Animation (e.g., "com.apple.WindowServer.AssemblyBuffer"). When Core Animation (e.g., the second application) encounters this reference while processing a hierarchical object, it can look into a table (or other internal data storage) to identify the string and associated functions. Core Animation can then use these functions to call into the window manager as described herein.

Figure 3B:
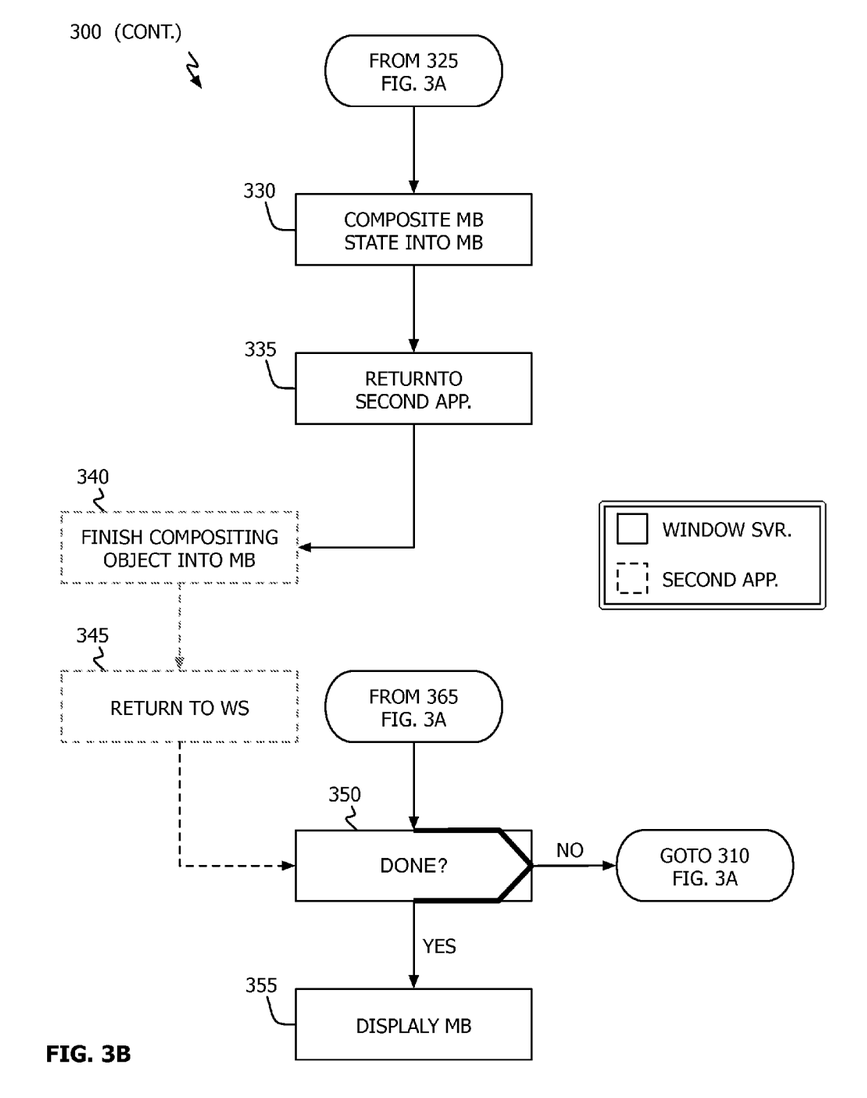

Referring to FIG. 3B, when called by the second application (block 325), the window manager can composite the referenced bitmap into a window manager memory buffer (block 330). The memory buffer used may, or may not, be the window manager's assembly buffer. With its "callback task" complete, the window manager executes a return to the second application (block 335). Continuing the above example, when the window manager is called by Core Animation (block 325), it doesn't make a copy of the referenced memory buffer, but instead draws the assembly buffer into an OpenGL rendering context provided by Core Animation as part of the calling process of block 325. The OpenGL rendering context can be attached to a buffer defined by Core Animation. In this way, if Core Animation wants a copy to be made it can attach the OpenGL context to a temporary buffer before calling into the window server. If, on the other hand, Core Animation doesn't want a copy it can leave the OpenGL context attached to the assembly buffer. (In practice the OpenGL context is originally given to Core Animation by the window manager during acts in accordance with block 315).

The second application, in turn, can complete processing the layer tree (block 340), where after it executes a return to the window manager (block 345). If there are currently no more windows for the window manager to process (the "YES" prong of block 350), the window manager sends its memory buffer contents for display (block 355). Display operation 355 may involve sending the memory buffer contents to a frame buffer and then, using scan-out hardware, to a video display. If there remain windows to be processed before a display event (the "NO" prong of block 360), window manager operations continue at block 310 of FIG. 3A. Returning to FIG. 3A, if the object obtained in accordance with block 305 is not hierarchically structured (the "NO" prong of block 360), it may be composited into the window manager's memory buffer (block 360) whereafter window manager operations continue at block 350 in FIG. 3B.

Figure 4A:
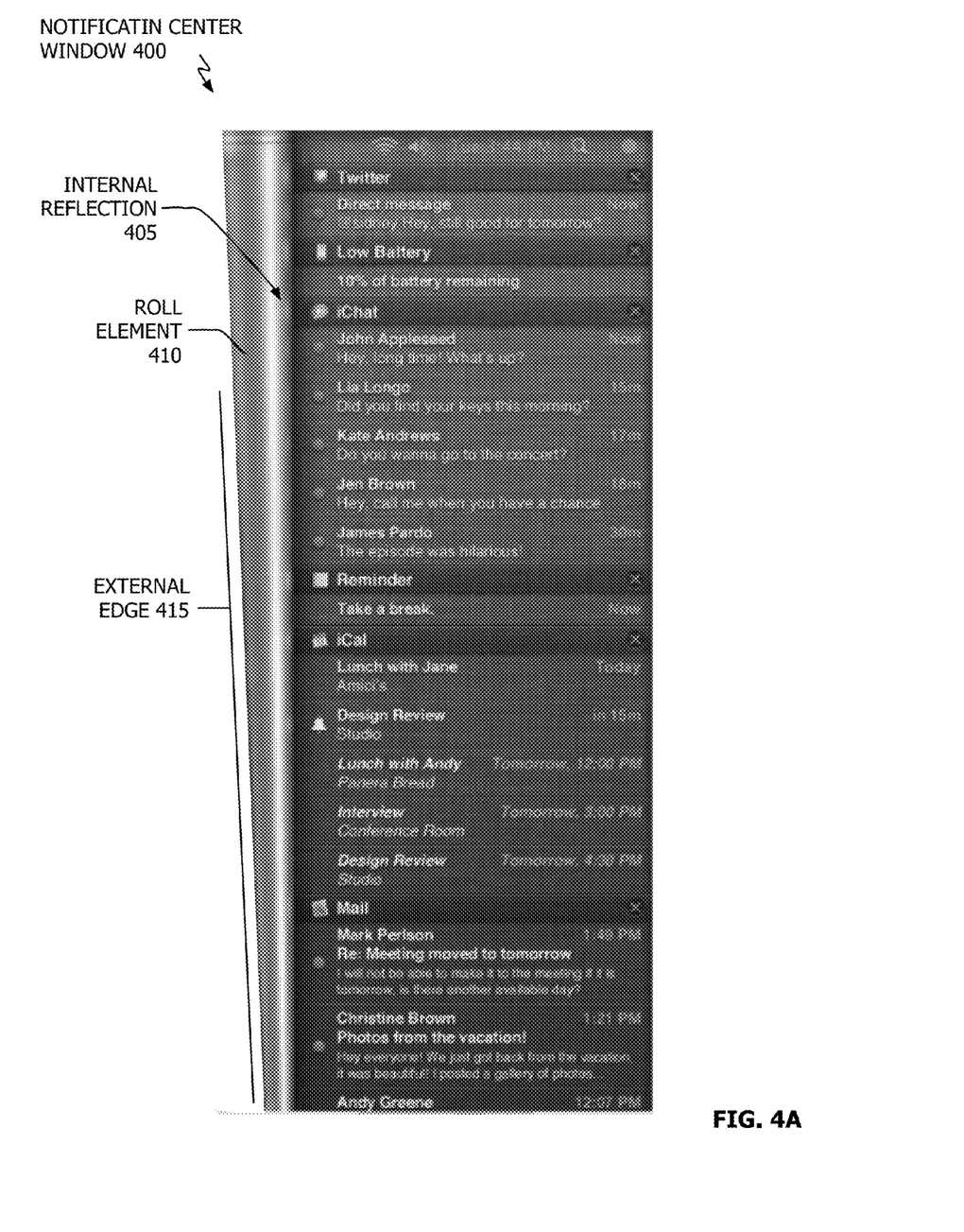
FIGS. 4A and 4B provide screen shots of a development environment illustrating certain features of the disclosed memory manager technique.

By way of example, and not limitation, a reentrant window manager in accordance with this disclosure has been used to provide a "Notification Center" application in Mac OS X with the means to generate reflection effects for its window based on the state of the desktop environment "below" it. That is, using knowledge of the desktop state that is, in the prior art, not available to the application. As shown in FIG. 4A, Notification Center window 400 presents a user with the status of their platform (e.g., battery level) and other relevant personal information (e.g., mail and calendar events). In one embodiment, when the Notification Center application launches, window 400 becomes the top-most window on the output display device. Internal reflection effect 405 may be provided on the Notification Center's window's "roll" element 410 in accordance with prior art rendering techniques. If Notification Window 400 is to provide a reflection along the roll's external edge 415 that reflects the state of the underlying desktop, information outside the Notification Center application's memory space is needed.

Figure 4B:
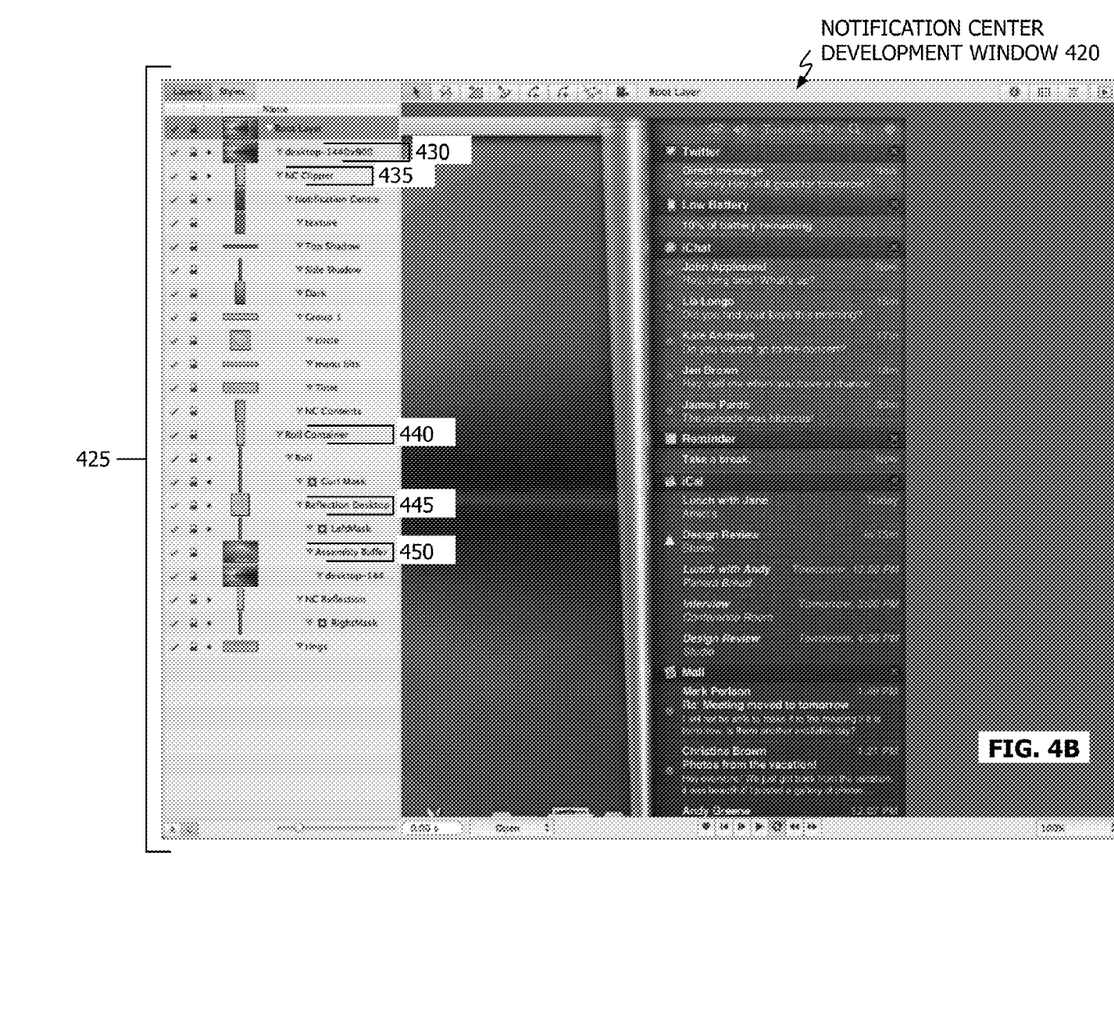

FIG. 4B shows Notification Center Development Window 420 as it appears during program development. Of particular interest is the hierarchical representation of the Notification Window object in region 425. Specifically, within region 425 the Notification Window object's layer tree is represented in an indented-list format. As shown there, the Notification Window object's Root Layer encompasses Desktop Element 430, Notification Center (NC) Clipper 435, and Roll Container 440. Roll Container 440 may be seen to include Reflection Desktop 445 which, in turn, includes Assembly Buffer element 450. In this embodiment, it is Assembly Buffer element 450 that references the bitmap representation of the desktop environment (as generated by a window manager in accordance with this disclosure) at the time the window manager calls into Core Animation with the Notification Window object's layer tree. (See FIG. 3A at 315.)

Figure 5:
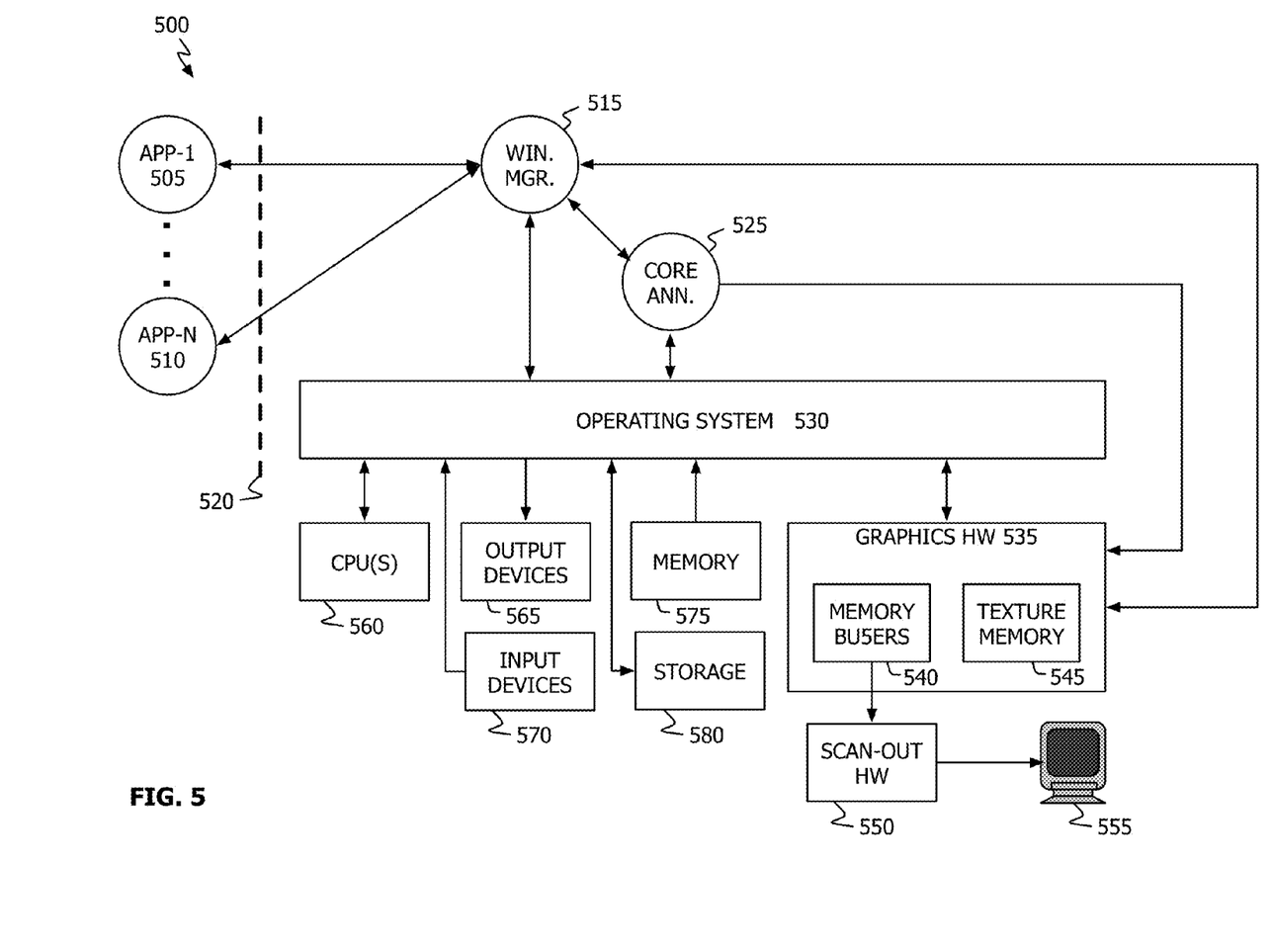
FIG. 5 shows, in block diagram form, a system that may implement the window manager operation of FIG. 3.

Turning now to FIG. 5, illustrative computer system 500 within which the disclosed memory manager may be implemented is shown. Computer system 500 includes one or more client applications (505 and 510) that communicate with window manager 515 through one or more application programming interface (API) libraries 520. Applications 505 and 510 may, for example, include media players, web browsers, games, office software, databases, system utilities, etc. In one embodiment, applications 505 and 510 communicate with window manager 515 through an OpenGL API. As described above with respect to FIG. 3, window manager 515 may also communicate with a "second application" such as, for example, Core Animation 525. Both window manager 515 and Core Animation 525 may communicate with operating system 530 and graphics hardware 535 through one or more APIs such as OpenGL or Direct3D (not shown). (DIRECT3D is a registered trademark of the Microsoft Corporation.) Graphics hardware 535 typically includes both working or buffer memory 540 and texture memory 545. Texture memory may be used to store texture maps so that they may be applied to the surfaces of graphical objects. Scan-out hardware 550 takes the content of memory buffers (e.g., assembly or frame buffer memory) and sends it to display device 555 (e.g., a standard computer screen or a touch screen).

System 500 is also shown to include one or more CPUs 560, one or more output devices 565, one or more input devices 570, memory 575, and storage 580. CPUs 560 may include any programmable control device including, without limitation, one or more members from: the Intel Core®, Intel Atom®, Pentium and Celeron® processor families. (INTEL CORE, INTEL ATOM, PENTIUM and CELERON are registered trademarks of the Intel Corporation.) CPUs 560 may also be implemented as a custom designed circuit that may be embodied in hardware devices such as application specific integrated circuits (ASICs) and field programmable gate arrays (FPGAs). Output devices 565 and input devices 570 may provide audio, and/or visual and/or tactile based interfaces. Memory 575 may include one or more different types of media (typically solid-state). For example, memory 575 may include memory cache, read-only memory (ROM), and/or random access memory (RAM). Storage 580 may store media (e.g., audio, image and video files), computer program instructions or software, preference information, device profile information, and any other suitable data. Storage 580 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 575 and storage 580 may be used to tangibly retain computer program instructions organized into one or more modules and written in any desired computer programming language. When executed by CPUs 560 and/or graphics hardware 535 such computer program code may implement one or more of the methods described herein.

While not shown, it will be understood that system 500 may also include communication interfaces to enable communicate with other equipment via one or more networks (e.g., local networks such as a USB network, a business' local area network, or a wide area network such as the Internet). System 500 may represent any number of computational platforms such as, without limitation, personal desktop computers, notebook computers, workstation computer systems, server computer systems, pad computer systems and other mobile platforms such as personal music and video devices and mobile telephones.

Various changes in the materials, components, circuit elements, as well as in the details of the described operational methods are possible without departing from the scope of the following claims. For instance, a hierarchical object's reference to the window manager's memory buffer may be provided in any number of ways. In one embodiment, the window manager itself may insert the reference into the object before passing it to the second application. In another embodiment, the hierarchical object may use a constant value known to the memory manager and second application alike to refer to a specified quantum of memory. In addition, the disclosed techniques are not restricted to the use of layer trees. Any object having a hierarchical structure may be used (i.e., not a bitmap).

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to execute a window server application to:
   composite one or more bitmap objects into an assembly buffer memory so that the assembly buffer memory has a first bitmap content;
   identify a hierarchically structured object to be composited into the assembly buffer memory, the hierarchically structured object including a reference to the first bitmap content;
   pass control for compositing the hierarchically structured object to a second application;
   receive control from the second application to composite the first bitmap content into a memory;
   composite the first bitmap content into the memory in response to receiving control from the second application;
   return control back to the second application after compositing the first bitmap content into the memory; and
   receive from the second application, after the returning, an indication that at least one element of the hierarchically structured object has been composited into the memory.

2. The non-transitory program storage device of claim 1, wherein the instructions to composite one or more bitmap objects into an assembly buffer memory comprise instructions to composite an ordered sequence of the one or more bitmap objects into the assembly buffer memory.

3. The non-transitory program storage device of claim 1, wherein at least one of the one or more bitmap objects comprise application backing store content.

4. The non-transitory program storage device of claim 1, wherein the instructions to identify a hierarchically structured object comprise instructions to identify a layer tree object.

5. The non-transitory program storage device of claim 1, wherein the reference to the first bitmap content in the hierarchically structured object comprises a copy of the first bitmap content.

6. The non-transitory program storage device of claim 1, wherein the instructions to composite the first bitmap content into the memory comprise instructions to use the reference to the first bitmap content from the hierarchically structured object.

7. The non-transitory program storage device of claim 1, further comprising instructions to cause the programmable control device to receive control back from the second application after the hierarchically structured object has been completely composited into the memory.

8. The non-transitory program storage device of claim 1, further comprising instructions to cause the programmable control device to cause the assembly buffer memory to be displayed on a display device.

9. The non-transitory program storage device of claim 1, wherein the second application comprises temporary buffer memory.

10. A method to display graphical objects in a computer system, comprising a window manager application performing the following acts:
    compositing one or more bitmap objects into an assembly buffer memory so that the assembly buffer memory has a first bitmap content;
    identifying a hierarchically structured object, the hierarchically structured object including a reference to the first bitmap content;
    passing control for compositing the hierarchically structured object to a second application;
    receiving control back from the second application to composite the first bitmap content into a memory;
    compositing the first bitmap content into the memory in response to receiving control from the second application;
    returning control for compositing the hierarchically structured object to the second application after compositing the first bitmap content into the memory; and
    receiving from the second application, after the returning, an indication that at least one element of the hierarchically structured object has been composited into the memory.

11. The method of claim 10, wherein the act of compositing one or more bitmap objects into an assembly buffer memory comprise compositing at least one application backing store content into the assembly buffer memory.

12. The method of claim 11, wherein the act of compositing the first bitmap content into the memory comprises using the reference to the first bitmap content from the hierarchically structured object.

13. The method of claim 10, further comprising receiving control back from the second application after the hierarchically structured object has been completely composited into the memory.

14. A non-transitory program storage device, readable by a programmable control device and comprising instructions stored thereon to cause the programmable control device to execute an application to:
    receive a hierarchically structured object from a window server application, the hierarchically structured object including elements of a first type and a reference to assembly buffer bitmap content;
    composite at least some of the first type of elements into a memory buffer;
    send a request to the window server application to composite the referenced assembly buffer bitmap content into the memory buffer;
    receive notification from the window server application that the referenced assembly buffer bitmap content has been composited into the memory buffer;
    composite elements of the first type into the memory buffer that were not previously composited into the memory buffer; and
    transfer control to the window server application, wherein the transfer indicates the hierarchically structured object has been composited into the memory buffer.

15. The non-transitory program storage device of claim 14, wherein the instructions to cause the programmable control device to composite elements of the first type into the memory buffer that were not previously composited into the assembly buffer further comprise instructions to cause the programmable control device to apply a visual effect to the content of the memory buffer.

16. A method to display graphical objects in a computer system, comprising:
    receiving a hierarchically structured object from a window server application, the hierarchically structured object including elements of a first type and a reference to assembly buffer bitmap content;
    compositing at least some elements of the first type of elements into an assembly buffer memory;
    sending a request to the window server application to composite the referenced assembly buffer bitmap content into a memory;
    receiving notification from the window server application that the referenced assembly buffer bitmap content has been composited into the memory;
    in response to the act of receiving notification, compositing other elements of the first type of elements into the memory, wherein the other elements of the first type of elements are not previously composited into the assembly buffer memory; and
    transferring control to the window server application, wherein the transfer indicates the hierarchically structured object has been composited into the memory.

17. The method of claim 16, wherein the act of compositing elements of the first type not previously composited into the assembly buffer memory further comprises applying a visual effect to the content of the memory.

* * * * *